United States Patent [19]
Berecz

[11] Patent Number: 4,687,397
[45] Date of Patent: Aug. 18, 1987

[54] COMPOSITE RIVET WITH STRIPPABLE MANDREL

[75] Inventor: Imre Berecz, El Toro, Calif.

[73] Assignee: Microdot Inc., Darien, Conn.

[21] Appl. No.: 738,960

[22] Filed: May 29, 1985

[51] Int. Cl.⁴ .............................................. F16B 19/08
[52] U.S. Cl. .................................... 411/503; 411/361; 411/377; 411/508; 411/901
[58] Field of Search .............. 411/361, 377, 501, 503, 411/508, 509, 900–903, 907, 908; 264/32, 33

[56] References Cited

U.S. PATENT DOCUMENTS

| 3,354,260 | 11/1967 | Brandt et al. | 411/909 X |
| 3,544,143 | 12/1970 | Ohlsson | 411/501 X |
| 4,143,580 | 3/1979 | Luhm | 411/45 |
| 4,230,017 | 10/1980 | Angelosanto | 411/361 X |
| 4,405,256 | 9/1983 | King, Jr. | 411/360 X |
| 4,478,543 | 10/1984 | Lyon | 411/908 X |
| 4,478,544 | 10/1984 | Strand | 411/908 X |

Primary Examiner—Peter A. Nelson
Attorney, Agent, or Firm—Lyman R. Lyon

[57] ABSTRACT

A composite rivet comprises an integral mandrel having a collar telescoped thereabout for controlling radial deformation of a head forming portion thereof.

4 Claims, 2 Drawing Figures

COMPOSITE RIVET WITH STRIPPABLE MANDREL

BACKGROUND OF THE INVENTION

The rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are widely used in the aircraft industry for airframe structural components. However, one characteristic of composite materials utilizing carbon fibers is that the carbon fibers are difficult to reform. Thus, the use of carbon fiber reinforced resins in rivets has heretofore been limited by the difficulty of efficiently forming the rivet heads.

SUMMARY OF THE INVENTION

The aforesaid problem is solved by the discovery that a rivet head can be formed by stripping the radially outermost carbon fibers and their encapsulating thermoset resin matrix from an integral internal mandrel that is tensioned relative to a workpiece. Stripping and compression of the fibers and resin matrix by a suitable tool is enabled by the use of a thermoplastic or "B"-stage thermoset resin matrix, which is softened due to the application of heat. To install the rivet, a filament wound or braided fiber reinforced plastic collar is telescoped over a head forming portion of the rivet. A portion of the fiber and resin matrix is thereafter stripped from an integral mandrel and compressed into the collar to form a radially extending rivet head that is integral with the shear portion of the rivet. A riveted connection is formed that exhibits relatively high shear and tensile strength.

DETAILED DESCRIPTION OF THE PREFERRED EMBODIMENT OF THE INVENTION

Figure 1:
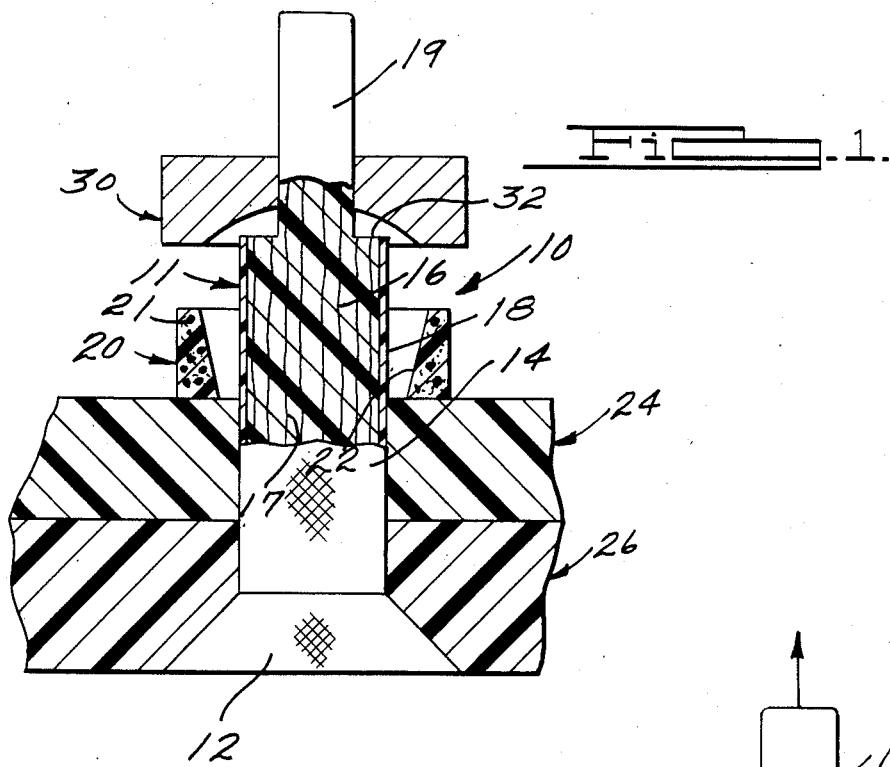
FIG. 1 is a sectional elevational view, of a preferred embodiment of the rivet of the instant invention.

As best seen in FIG. 1 of the drawings, a rivet 10 in accordance with a constructed embodiment of the instant invention comprises a thermoplastic or "B"-stage thermoset resin preform 11 having a preformed head portion 12, a shear portion 14, and a head forming portion 16. The preform 11 is reinforced by parallel carbon fibers 17 and a woven Kevlar sheath 18.

An integral mandrel 19 extends from the upper end of the head forming portion 16 of the preform 11 to facilitate tensioning of the rivet 10.

A fully polymerized thermoset plastic collar 20 having filament wound or braided carbon or Kevlar fibers 21 therein is disposed about the head forming portion 16 of the preform 11 to control deformation thereof. It is to be noted that the collar 20 has a truncated conical internal cavity 22 that diverges in the direction of the mandrel portion 19 of the preform 11 whereby the collar 20 is locked against the workpiece 24.

Figure 2:
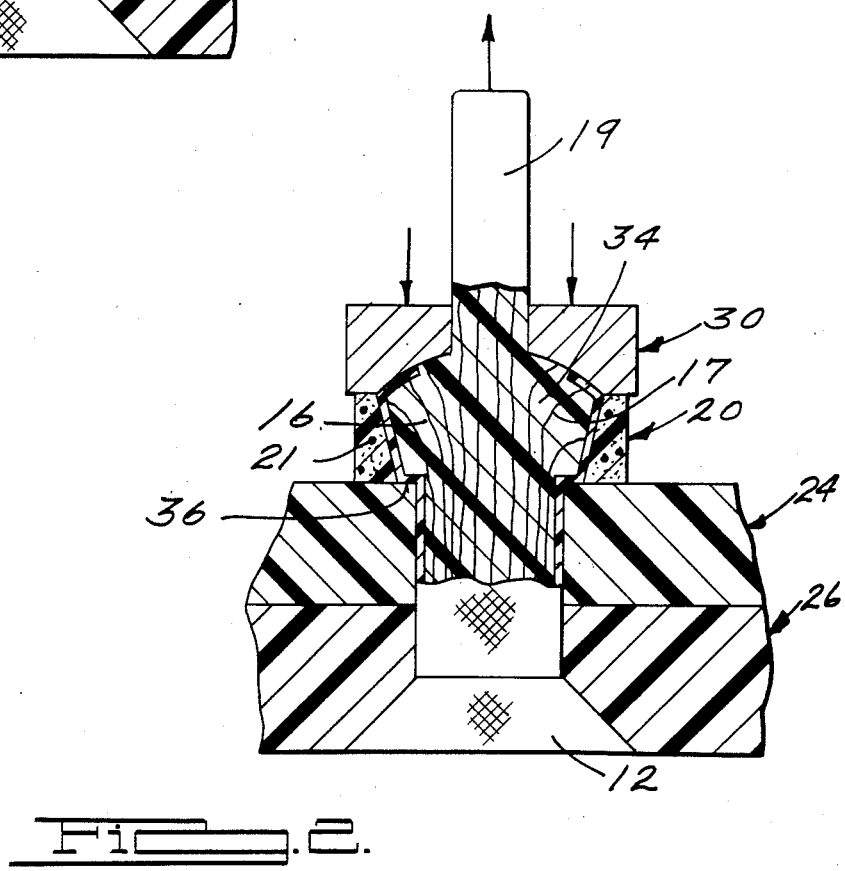
FIG. 2 is a view of the rivet of FIG. 1 after advancement of a forming tool concurrently with tensioning of the rivet mandrel to form a head on the installed rivet.

As seen by comparing FIG. 1 with FIG. 2 of the drawings, the mandrel 19 of the preform 11 is adapted to be pulled upwardly by a tensioning tool (not shown) of conventional design while a head forming tool 30 is concomitantly biased downwardly against a shoulder 32 on the head forming portion 16 of the preform 11 resulting in deformation of head forming portion 16 of the preform 11 into a conical head 34 illustrated in FIG. 2. The conical configuration of the head 34 locks the collar 20 against the workpiece 24 and aids in establishing the significant pullout strength exhibited by the rivet 10. It is to be noted that the reformed head 34 has an annular shoulder 36 in engagement with the workpiece 24.

In accordance with the instant invention, the head forming portion 16 of the preform 11 is stripped or separated from the mandrel portion 19 thereof. Such stripping is practical because the carbon fibers 17 are orientated parallel to one another and to the direction of movement of the tool 30. Moreover, the fibers 17 are separated from one another by the resin matrix which is softened by the application of heat by, for example, a hot air blast, preheat of the head forming tool 30, preheat of the entire preform 11, or heating of the entire rivet assembly 10 in situ.

While the preferred embodiment of the invention has been disclosed, it should be appreciated that the invention is susceptible of modification without departing from the scope of the following claims.

I claim:

1. A composite rivet comprising
a preformed head portion,
a shear portion,
a head forming portion integral with said shear portion,
an integral mandrel extending from said head forming portion, and
a collar having an inside diameter greater than the initial outside diameter of the head forming portion of said rivet, said collar being telescoped about and radially aligned with said head forming portion for controlling radial deformation thereof,
said head forming portion being strippable from said mandrel and deformable radially outwardly to the inside diameter of said collar to lock said collar against axial movement away from the preformed head portion of said rivet.

2. A composite rivet in accordance with claim 1 wherein said collar has a truncated upwardly divergent conical cavity therein for the acceptance of the head forming portion of said rivet.

3. A composite rivet comprising
a preformed head portion,
a shear portion,
a head forming portion integral with said shear portion,
an integral mandrel extending from said head forming portion, and
a collar having a truncated upwardly divergent conical cavity therein telescoped about and radially aligned with said head forming portion for controlling radial deformation thereof,
said collar being reinforced with circumferentially extending fibers,
said head forming portion being stripped from said mandrel and extending radially outwardly to lock said collar against axial movement away from the preformed head portion of said rivet.

4. A method of installing a composite rivet comprising a preformed head portion, a shear portion, a head forming portion, and an integral mandrel extending centrally of said head, shear and head forming portions and away from the head portion thereof, said method comprising the steps of installing said rivet in an aperture in a workpiece, assembling a collar about the head forming portion of said rivet for controlling deformation thereof, heating said preform, and stripping said head forming portion away from said mandrel portion to form an integral head on said rivet while maintaining the mandrel portion of said rivet.

* * * * *